US008358982B2

(12) United States Patent  (10) Patent No.: US 8,358,982 B2
Van Der Velde et al.  (45) Date of Patent: Jan. 22, 2013

(54) USER EQUIPMENT FOR TRIGGERING MEASUREMENT REPORT AND METHOD OF ITS OPERATION

(75) Inventors: Himke Van Der Velde, Staines (GB); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 12/695,973

(22) Filed: Jan. 28, 2010

(65) Prior Publication Data

US 2010/0197300 A1   Aug. 5, 2010

(30) Foreign Application Priority Data

Jan. 30, 2009   (GB) .................................. 0901551.2

(51) Int. Cl.
*H04W 24/00*   (2009.01)
(52) U.S. Cl. ..................... 455/67.11; 455/425
(58) Field of Classification Search ............. 455/67.11, 455/425, 436, 437, 438
See application file for complete search history.

(56) References Cited

U.S. PATENT DOCUMENTS

| | | | | |
|---|---|---|---|---|
| 5,701,585 | A | * | 12/1997 | Kallin et al. ................... 455/437 |
| 2007/0060067 | A1 | * | 3/2007 | Ruuska ....................... 455/67.11 |
| 2008/0167041 | A1 | * | 7/2008 | Wang et al. .................... 455/436 |
| 2009/0069012 | A1 | * | 3/2009 | Tu ................................. 455/436 |
| 2010/0197300 | A1 | * | 8/2010 | Van Der Velde et al. ..... 455/425 |

FOREIGN PATENT DOCUMENTS

| | | | |
|---|---|---|---|
| EP | 1 499 147 | A1 | 1/2005 |
| EP | 2 037 696 | A1 | 3/2009 |
| GB | EP2037696 | * | 3/2009 |
| WO | 99/43178 | A1 | 8/1999 |
| WO | 00/70897 | A1 | 11/2000 |
| WO | 2008/006278 | A1 | 1/2008 |

OTHER PUBLICATIONS

3GPP TS 36.331 V8.4.0, 3rd Generation Partnership Project, Technical Specification Grop Radio Access Network, Evolved Universal Terrestrial Radio Access (E-UTRA) Radio Resource (RRC), Protocol specification (Release 8).

* cited by examiner

*Primary Examiner* — Patrick Edouard
*Assistant Examiner* — Myron Wyche
(74) *Attorney, Agent, or Firm* — Jefferson IP Law, LLP

(57) ABSTRACT

A User Equipment (UE) apparatus for use in a cellular wireless communications network, and method for its operation, are provided. The apparatus includes a measuring unit for measuring signals received from at least one of a serving cell of the network and from neighboring cells, a memory for storing information defining a plurality of conditions for triggering the UE to send a measurement report to the network, the measurement report comprising a result of at least one measurement performed by the UE, a determining unit for determining when one of the plurality of conditions is met, and a sending unit for sending, in response to one of the plurality of conditions being met, a measurement report for reception by the network, wherein each of the plurality of conditions is defined by a respective plurality of at least one of parameters and variables.

7 Claims, 5 Drawing Sheets

USER EQUIPMENT FOR TRIGGERING MEASUREMENT REPORT AND METHOD OF ITS OPERATION

PRIORITY

This application claims the benefit under 35 U.S.C. §119 (a) of a United Kingdom patent application filed on Jan. 30, 2009 in the United Kingdom Intellectual Property Office and assigned Serial No. 0901551.2, the entire disclosure of which is hereby incorporated by reference.

BACKGROUND OF THE INVENTION

1. Field of the Invention

The present invention relates to wireless communication networks. More particularly, although not exclusively, the present invention relates to networks adapted to implement or operate according to the $3^{rd}$ Generation Partnership Project (3GPP) Technical Specification (TS) 36.331 version (v) 8.4.0, the entire disclosure of which is hereby incorporated by reference, and/or to User Equipment (UE) for use in such networks.

2. Description of the Related Art

The $3^{rd}$ Generation Partnership Project (3GPP) Technical Specification (TS) 36.331 version (v) 8.4.0 specifies a number of conditions, criteria or events in response to which User Equipment (UE) is triggered to send a measurement report to a network, such as an Evolved Universal Mobile Telecommunications System (UMTS) Terrestrial Radio Access Network (E-UTRAN).

To operate in accordance with the 3GPP TS 36.331 v 8.4.0 specification, the UE is arranged/adapted to report measurement information in accordance with a measurement configuration, which is provided to the UE by the E-UTRAN, that is, the E-UTRAN provides a signal or signals containing the measurement configuration to the UE.

Generally, the measurement configuration tells the UE, inter alia, the conditions, criteria or events in response to which it should send a measurement report, that is, the measurement configuration tells the UE the "reporting criteria". Further, the measurement configuration tells the UE what to measure when triggered to send a report. In other words, the measurement configuration tells the UE the measurement objects, which are the objects on which the UE should perform the measurements. Also, the measurement configuration tells the UE the format in which the measurement results should be sent. In other words, the measurement configuration tells the UE the reporting format, including the quantities that the UE should include in the measurement report and associated information, such as the number of cells to report.

These events, in response to which the UE should send a measurement report, include events A1, A2, A3, A4, A5, B1 and B2 as defined in Table 1 below. Here, "serving" refers to a currently serving cell, e.g., a cell with which the UE is in communication, and "neighbor" refers to a neighboring cell.

Table 1 shows the current definitions of these events in 3GPP TS 33.331 v 8.4.0. Table 1 defines these events in terms of entering and leaving conditions. The entering conditions define the circumstances under which an event is regarded as occurring, when the event was not previously occurring. In other words, the UE is triggered to send a measurement report when there is a change from the conditions specified in the "entering condition" column not being met to being met.

The "leaving conditions" specify the conditions under which each event is considered to be no longer occurring. Thus, the UE is triggered to send a measurement report when, after entering an event, the circumstances change and the relevant leaving condition is met.

In each case, the entering conditions and leaving conditions associated with the various events, which can be regarded as defining the measurement report triggering conditions, are defined using a plurality of parameters or variables including Ms, Mn, Ofn, Ocn, Ofs, Ocs, Hys, Off, Thresh, Thresh1, and Thresh2, where:

Ms denotes a measurement result of a serving cell,

Mn denotes a measurement result of a neighboring cell,

Ofn denotes a frequency specific offset of the frequency of the neighbor cell,

Ocn denotes a cell specific offset of the neighbor cell,

Ofs denotes a frequency specific offset of the serving frequency,

Ocs denotes a cell specific offset of the serving cell,

Hys denotes a hysteresis parameter for the respective event,

Off denotes an offset parameter for the respective event,

Thresh denotes a threshold parameter for the respective event,

Thresh1 denotes a threshold parameter for the respective event, and

Thresh2 denotes a threshold parameter for the respective event.

Further information on these parameters or variables can be found at the end of this description, in an extract from 3GPP TS 36.331 v 8.4.0.

SUMMARY OF THE INVENTION

An aspect of the present invention is to address at least the above-mentioned problems and/or disadvantages and to provide at least the advantages described below. Accordingly, an aspect of the present invention is to provide new definitions for at least some events, in response to which, User Equipment (UE) is triggered to send a measurement report to a network. The use of these new definitions provides at least one technical advantage over the use of the definitions included in the $3^{rd}$ Generation Partnership Project (3GPP) Technical Specification (TS) 36.331 version (v) 8.4.0.

Another aspect of the present invention is provide trigger measurement reporting by User Equipment (UE) using different criteria or conditions from those previously proposed, so as to provide at least one technical advantage or address at least one problem associated with the related art.

In accordance with an aspect of the present invention, a UE apparatus for use in a cellular wireless communications network is provided. The apparatus includes a measuring unit for measuring signals received from at least one of a serving cell of the network (e.g., a cell which is currently being used by the UE for communication with, or via, the network) and from neighboring cells, a memory for storing information defining a plurality of conditions for triggering the UE to send a measurement report to the network, the measurement report comprising a result of at least one measurement (e.g., a measurement of a signal received from a serving or neighboring cell) performed by the UE, a determining unit for determining when one of the plurality of conditions is met, and a sending unit for sending, in response to one of the plurality of conditions being met, a measurement report for reception by the network, wherein each of the plurality of conditions is defined by a respective plurality of at least one of parameters and variables. The at least one of the parameters and variables may include a result of a measurement of a signal received from a serving cell, a threshold parameter (e.g., a predetermined value), and at least one offset value associated with at least one of a serving cell and a serving frequency (e.g., a frequency used for transmitting signals from the serving cell to the UE).

In accordance with another aspect of the present invention, a method of operating UE adapted for use in a cellular wireless telecommunications network is provided. The method includes storing information that defines a plurality of conditions for triggering the UE to send a measurement report to the network, the measurement report comprising a result of at least one measurement (e.g., a measurement of a signal received from a serving or neighboring cell) performed by the UE, determining when one of the plurality of conditions is met, and in response to one of the plurality of conditions being met, send the measurement report for reception by the network, wherein each of the plurality of conditions is defined by a respective plurality of at least one of parameters and variables. The at least one of the parameters and variables may include: a result of a measurement of a signal received from a serving cell, a threshold parameter (e.g., a predetermined value), and at least one offset value associated with at least one of a serving cell and a serving frequency (e.g., a frequency used for transmitting signals from the serving cell to the UE).

In certain exemplary embodiments, the method further comprises receiving the information from the network.

In certain exemplary embodiments, the plurality of conditions comprises a condition defined by at least one of:

$Ms+Ofs+Ocs-Hys>Thresh;$ $Ms+Ofs+Ocs+Hys<Thresh;$ $Ms+Ofs+Ocs+Hys<Thresh;$ $Ms+Ofs+Ocs-Hys>Thresh;$ $(Ms+Ofs+Ocs+Hys<Thresh1)$ AND $(Mn+Ofn+Ocn-Hys>Thresh2);$ $(Ms+Ofs+Ocs-Hys>Thresh1)$ OR $(Mn+Ofn+Ocn+Hys<Thresh2);$ $(Ms+Ofs+Ocs+Hys<Thresh1)$ AND $(Mn+Ofn-Hys>Thresh2);$ and $(Ms+Ofs+Ocs-Hys>Thresh1)$ OR $(Mn+Ofn+Hys<Thresh2),$ and wherein:
Ms denotes a measurement result of a serving cell,
Mn denotes a measurement result of a neighboring cell,
Ofn denotes a frequency specific offset of the frequency of the neighbor cell,
Ocn denotes a cell specific offset of the neighbor cell,
Ofs denotes a frequency specific offset of the serving frequency,
Ocs denotes a cell specific offset of the serving cell,
Hys denotes a hysteresis parameter for the respective event,
Off denotes an offset parameter for the respective event,
Thresh denotes a threshold parameter for the respective event,
Thresh1 denotes a threshold parameter for the respective event, and
Thresh2 denotes a threshold parameter for the respective event.

The measurement result of a serving cell may, for example, be the result of the UE performing a measurement of Reference Symbols (RS) transmitted by the cell. The network configures actual measurement quantity (i.e., tells the UE what to measure), which for EUTRA is RS Received Power or RS Received Quality.

Similarly, the measurement result of a neighboring cell may be the result of the UE performing a measurement of Reference Symbols (RS) transmitted by the neighboring cell.

Note, however, that for other radio access technologies, other quantities may apply.

In accordance with another aspect of the invention, a method of operating user equipment (UE) adapted for use in a cellular wireless telecommunications network is provided. The method includes storing, information that defines a plurality of conditions for triggering the UE to send a measurement report to the network, each condition being associated with a respective event, and the measurement report comprising a result of at least one measurement performed by the UE, determining when one of the plurality of conditions is met; and in response to one of the plurality of conditions being met, sending the measurement report for reception by the network, wherein said plurality of conditions include at least one of:

$Ms+Ofs+Ocs-Hys>Thresh;$ $Ms+Ofs+Ocs+Hys<Thresh;$ $Ms+Ofs+Ocs+Hys<Thresh;$ $Ms+Ofs+Ocs-Hys>Thresh;$ $(Ms+Ofs+Ocs+Hys<Thresh1)$ AND $(Mn+Ofn+Ocn-Hys>Thresh2);$ $(Ms+Ofs+Ocs-Hys>Thresh1)$ OR $(Mn+Ofn+Ocn+Hys<Thresh2);$ $(Ms+Ofs+Ocs+Hys<Thresh1)$ AND $(Mn+Ofn-Hys>Thresh2);$ and $(Ms+Ofs+Ocs-Hys>Thresh1)$ OR $(Mn+Ofn+Hys<Thresh2),$ and wherein:
Ms denotes a measurement result of a serving cell,
Mn denotes a measurement result of a neighboring cell,
Ofn denotes a frequency specific offset of the frequency of the neighbor cell,
Ocn denotes a cell specific offset of the neighbor cell,
Ofs denotes a frequency specific offset of the serving frequency,
Ocs denotes a cell specific offset of the serving cell,
Hys denotes a hysteresis parameter for the respective event,
Off denotes an offset parameter for the respective event,
Thresh denotes a threshold parameter for the respective event,
Thresh1 denotes a threshold parameter for the respective event, and
Thresh2 denotes a threshold parameter for the respective event.

In accordance with another aspect of the present inventions, a UE or other apparatus adapted to operate in accordance with a method as defined by any claim is provided.

In accordance with yet another aspect of the present invention, a computer program comprising instructions arranged, when executed, to implement a method as claimed in any claim, and machine-readable storage storing such a program is provided.

In accordance with still another aspect of the present invention, a communication system comprising a communication network and UE, the network being adapted to supply the information to the UE, is provided.

It will be appreciated that in certain exemplary embodiments:

a) the network configures the UE to perform measurement of specific quantities;
b) the network configures the UE to send a measurement report message when certain conditions are met, i.e., the network configures triggering conditions for sending of the measurement report;
c) certain exemplary embodiments of the present invention relate to event triggered reporting, that is a measurement report is triggered when the quantity fulfils certain conditions ('the event');
d) the events typically involve comparing measured quantities with thresholds or comparing measured quantities of different cells (i.e., serving and neighboring); and
e) the network may, for various reasons configure offsets, to be applied to the measured quantities. This applies both to serving and neighboring cells.

It should be noted that offsets may be defined in frequency and cell lists that include both the serving and neighboring cells, i.e., the serving and neighboring cells may be signaled in substantially the same way. As a consequence, these lists may not need to be changed by the network when the UE moves to another cell or frequency.

In certain exemplary embodiments of the present invention the serving offsets are applied for all event conditions, which, assuming the offsets are relevant not only for the comparison between cells but also for the comparisons to thresholds, avoids the need to reconfigure thresholds when the UE moves to a cell with an offset different from the current serving cell.

In certain exemplary embodiments, the serving offsets are used to define all event conditions that also use Ms (i.e., a result of a measurement on a serving cell).

It will be appreciated, that with regard to the conditions/variables mentioned above:

a) in certain exemplary embodiments there are events, such as A3, where there is a comparison between serving and neighbor cells;
b) some conditions involve multiple thresholds;
c) conditions involving comparison may also involve an offset (e.g., the neighbor cell is offset better than the serving cell); and
d) there may be offsets associated with the neighbor cells as well as the serving cells/frequencies in one or more of the conditions.

It is possible to distinguish/separate the condition parameters that are related to the measurementObject (i.e., related to the frequencies to be measured) (concerns frequency and cell specific offset) from the parameters that are in the reportConfig (i.e., parameters defined for each condition like threshold, offset, etc.).

Again, in certain exemplary embodiments of the present invention all conditions affecting the serving cell apply the cell and frequency specific offsets defined for the serving cell/frequency to avoid reconfiguration.

Certain exemplary embodiments use information defining conditions for events currently specified in 3GPP TS 36.331, but the present invention is not limited to such applications, it has broader application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of the certain exemplary embodiments of present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Measurement Data Model

The measurement data model in $3^{rd}$ Generation Partnership Project (3GPP) Technical Specification (TS) 36.331 version (v) 8.4.0 will be described below with reference to FIG. 1.

Figure 1:
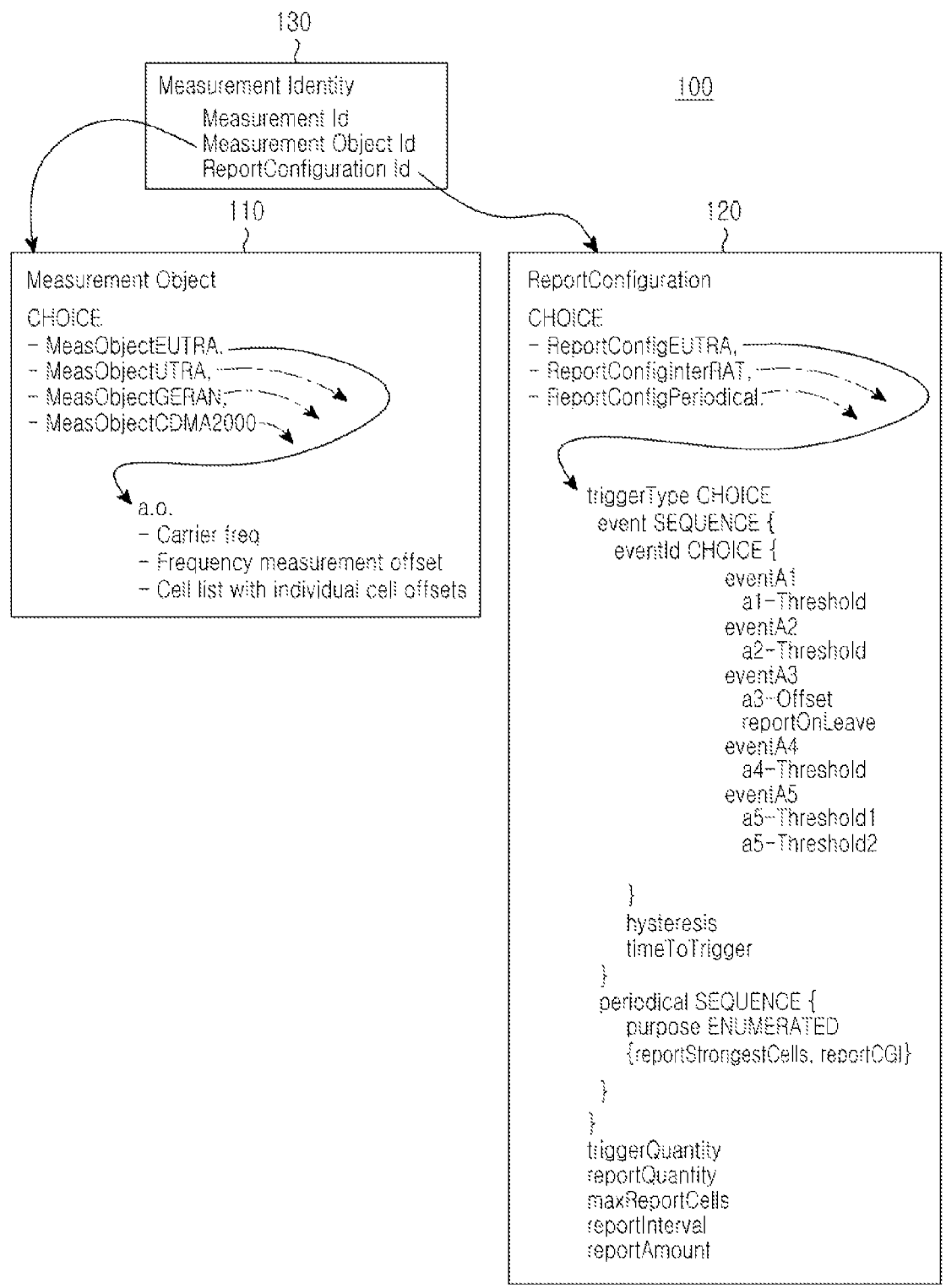
FIG. 1 is a schematic representation of a measurement data model in $3^{rd}$ Generation Partnership Project (3GPP) Technical Specification (TS) 36.331 version (v) 8.4.0 according to the related art.

FIG. 1 is a schematic representation of a measurement data model in 3GPP TS 36.331 v 8.4.0 according to the related art.

Referring to FIG. 1, there are two main parts of the measurement data model 100, namely a measurement object 110 and a reporting configuration 120, which are linked together by a measurement identity 130.

The measurement object 110 describes a set of cells. The set of cells may be described by only denoting a carrier frequency, or by listing specific cells on a certain frequency. A measurement offset can be configured per frequency. In addition, for an Evolved Universal Mobile Telecommunications System (UMTS) Terrestrial Radio Access Network (E-UTRAN) (and not for other Radio Access Technology (RAT) types), a cell specific offset can be configured per cell.

The reporting configuration 120 lists the characteristics of the measurement. The characteristics of the measurement may include whether the measurement is periodic or event based, and detailed parameters for the measurement. The detailed parameters for the measurement may include thresholds, quantities, etc.

Defined Measurement Events of the Related Art

3GPP TS 36.331 v 8.4.0 defines seven events, namely A1, A2, A3, A4, A5, B1 and B2. Rather than having a specific procedural description, such as that disclosed in 3GPP TS 25.331, the entire disclosure of which is hereby incorporated by reference, there is only one description for event based measurement triggering in 3GPP TS 36.331 v 8.4.0. However, for each event, a different "entering condition" (i.e., when a cell is entering the reporting conditions for this event), and a "leaving condition" (i.e., when a cell is leaving the reporting conditions for this event) is defined. The flowchart of this process is described below with reference to FIG. 2.

Figure 2:
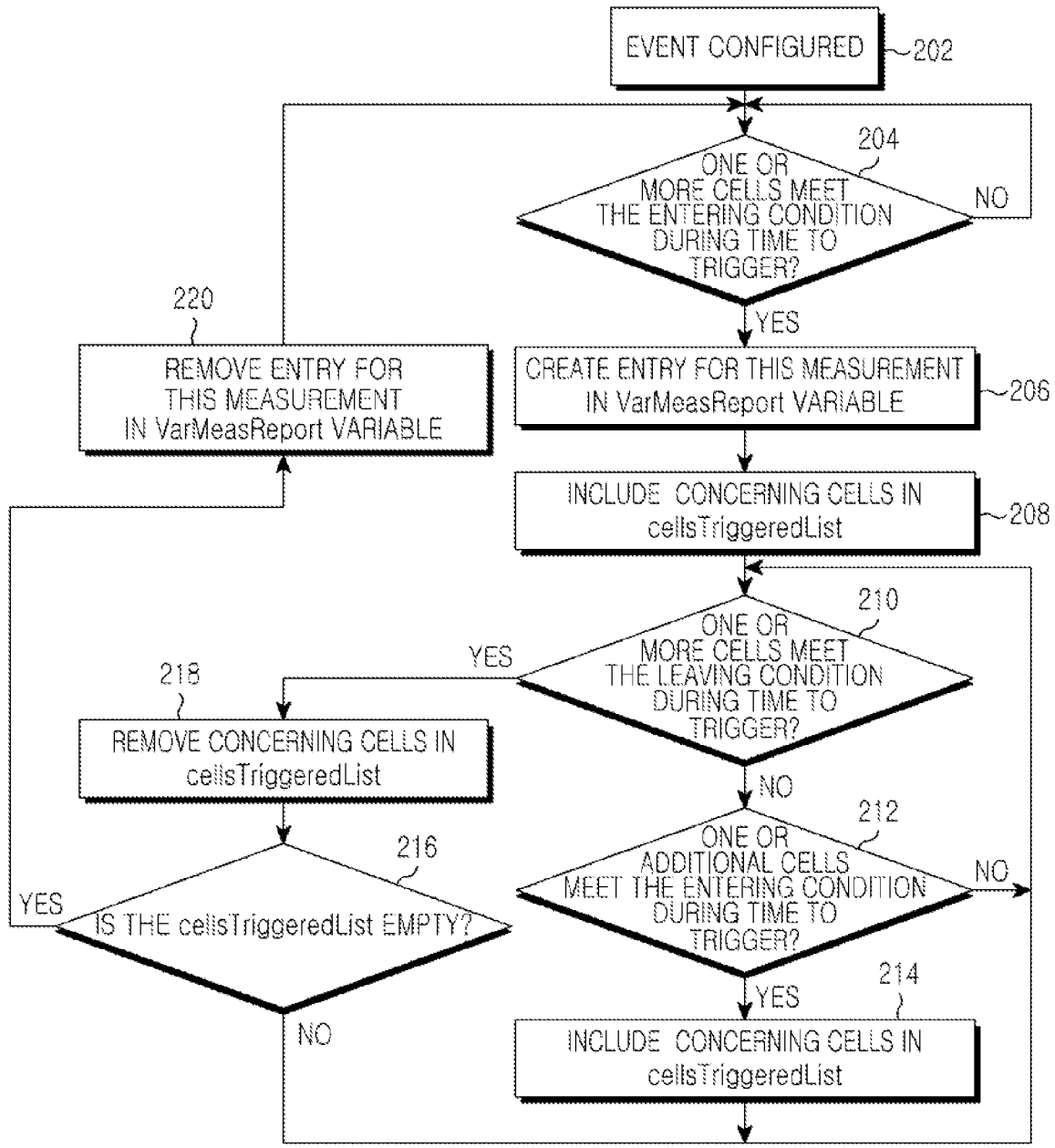
FIG. 2 is a flowchart illustrating CellsTriggeredList management based on entering/leaving conditions according to an exemplary embodiment of the present invention.

FIG. 2 is a flowchart illustrating CellsTriggeredList management based on entering/leaving conditions according to an exemplary embodiment of the present invention.

Referring to FIG. 2, an event is configured in step 202. In step 204, it is determined if one or more cells meet the entering condition during a time to trigger. If it is determined at step 204 that one or more cells do not meet the entering condition during the time to trigger, the process returns to step 204. However, if it is determined at step 204 that one or more cells meet the entering condition during the time to trigger, the process proceeds to step 206. In step 206, an entry is created for the measurement in the VarMeasReport variable. In step 208, concerning cells are included in cellsTriggeredList.

In step 210, it is determined if one or more cells meet the leaving condition during a time to trigger. If it is determined at step 210 that one or more cells do not meet the leaving condition during the time to trigger, the process proceeds to step 212. In step 212, it is determined if one or additional cells meet the entering condition during a time to trigger. If it is determined at step 212 that one or additional cells do not meet the entering condition during the time to trigger the process returns to step 210. However, if it is determined at step 212 that one or additional cells meet the entering condition during the time to trigger the process proceeds to step 214. In step 214, concerning cells are included in the cellsTriggeredList and the process returns to step 210.

Returning to step 210, if it is determined that one or more cells meet the leaving condition during the time to trigger, the process proceeds to step 218. In step 218, concerning cells are removed in cellsTriggeredList. In step 216, it is determined if the cellsTriggeredList is empty. If it is determined at step 216 that the cellsTriggeredList is not empty the process returns to step 210. However, if it is determined at step 216 that the cellsTriggeredList is empty the process proceeds to step 220. In step 220, the entry for the measurement is removed in VarMeasReport variable. Thereafter, the process returns to step 204.

Table 1 provides an overview of the entering and leaving conditions for the different events for event based measurement reporting.

TABLE 1

| | Entering condition | Leaving condition |
|---|---|---|
| Event A1 (Serving becomes better than threshold) | Ms − Hys > Thresh | Ms + Hys < Thresh |
| Event A2 (Serving becomes worse than threshold) | Ms + Hys < Thresh | Ms − Hys > Thresh |
| Event A3 (Neighbor becomes offset better than serving) | Mn + Ofn + Ocn − Hys > Ms + Ofs + Ocs + Off | Mn + Ofn + Ocn + Hys < Ms + Ofs + Ocs + Off |
| Event A4 (Neighbor becomes better than threshold) | Mn + Ofn + Ocn − Hys > Thresh | Mn + Ofn + Ocn + Hys < Thresh |
| Event A5 (Serving becomes worse than threshold1 and neighbor becomes better than threshold2) | Ms + Hys < Thresh 1 AND Mn + Ofn + Ocn − Hys > Thresh2 | Ms − Hys > Thresh 1 OR Mn + Ofn + Ocn + Hys < Thresh 2 |
| Event B1 (Inter RAT neighbor becomes better than threshold) | Mn + Ofn − Hys > Thresh | Mn + Ofn + Hys < Thresh |
| Event B2 (Serving becomes worse than threshold1 and inter RAT neighbor becomes better than threshold2) | Ms + Hys < Thresh 1 AND Mn + Ofn − Hys > Thresh 2 | Ms − Hys > Thresh 1 OR Mn + Ofn + Hys < Thresh 2 |

For event based reporting, two different offsets are used, namely a frequency offset and a cell specific offset.

The frequency offset may be configured for a serving frequency (Ofs), a neighboring E-UTRA-frequency (Ofn) or an inter-RAT frequency (Ofn for Code Division Multiple Access (CMDA), Global System for Mobile Communications (GSM) Enhanced Data Rates for GSM Evolution (EDGE) Radio Access Network (GERAN) and Universal Terrestrial Radio Access (UTRA))

The cell specific offset may be configured for a serving cell (Ocs) or the neighboring intra-freq or inter-freq Evolved-UTRA (E-UTRA) cell (Ofn).

Due to recent changes, the 3GPP TS 36.331 data model no longer has any serving cell/frequency specific parameter group. The serving cell offset and serving cell frequency offset are merely offsets in an E-UTRA measurement object corresponding to the serving frequency.

As can be seen in Table 1, Ofn and Ocn are used whenever possible. Ofn is used in all possible events, i.e., whenever Mn is measured, the Ofn is applied. Ocn is used in all possible events, i.e., whenever Mn is a measurement for a neighboring E-UTRA cell, Ocn is applied.

However this is not true for Ofs and Ocs. These offsets are only used in event A3.

Herein it is helpful to understand why there are offsets. With respect to cell specific offsets, R2-072721, the entire disclosure of which is hereby incorporated by reference, describes the use of cell specific offsets and the reading of neighboring Broadcast CHannel (BCH). RAN2/58bis, the entire disclosure of which is hereby incorporated by reference, explains why there are cell specific offsets. The usage of cell specific offsets will be described below with reference to FIG. 3

Figure 3:
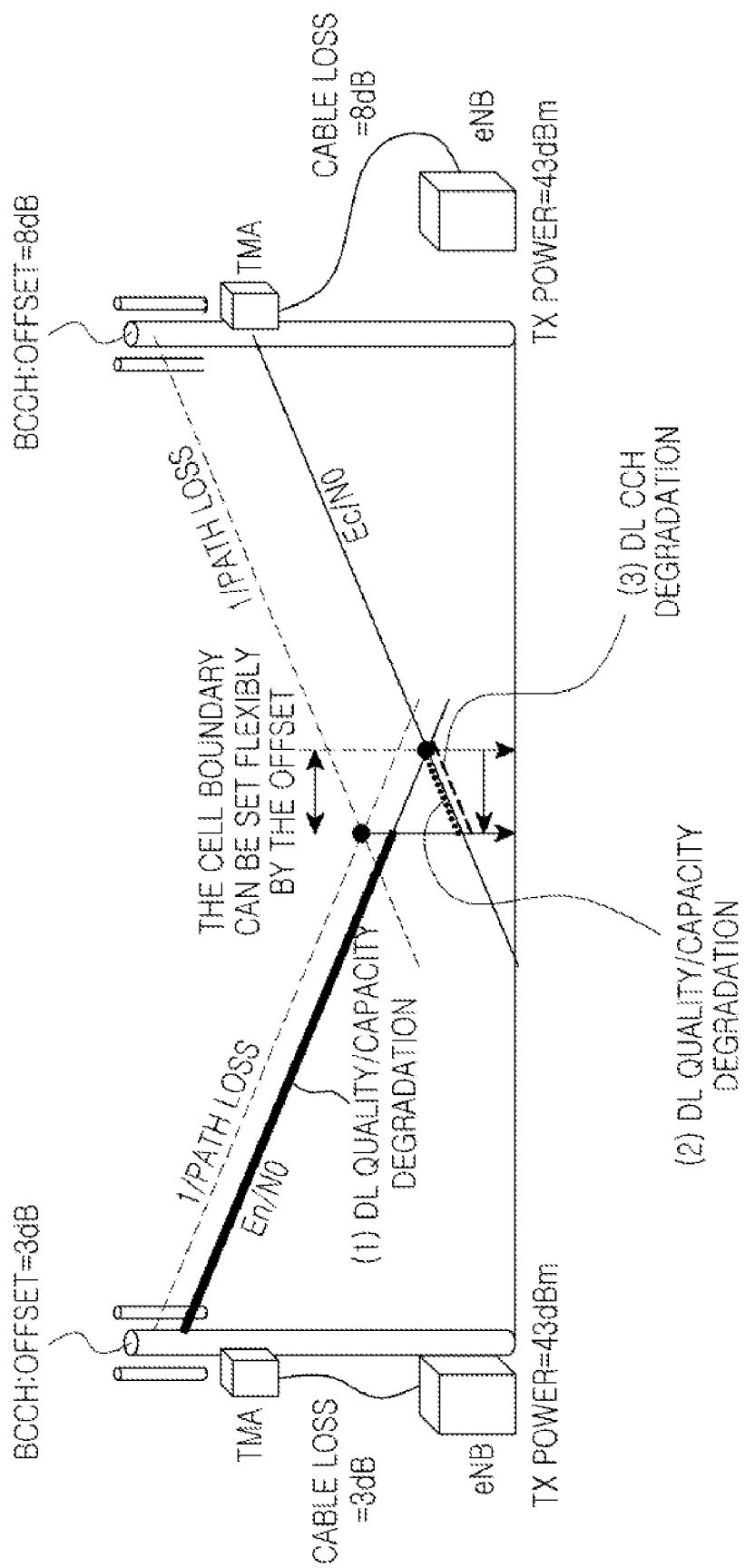
FIG. 3 illustrates DownLink (DL)/UpLink (UL) imbalance mitigation by the use of cell specific offsets according to an exemplary embodiment of the present invention.

FIG. 3 illustrates DownLink (DL)/UpLink (UL) imbalance mitigation by the use of cell specific offsets according to an exemplary embodiment of the present invention.

Referring to FIG. 3, the usage of cell specific offsets allows the cell coverage area of cells to be adjusted, such as in case of an UL/DL imbalance. If a cell has a large cable loss resulting in a lower Tx power than its neighboring cell, the UL might be better than expected by the Ec/No measurement.

Thus, such a cell could be provided with a larger offset so that this cell becomes earlier/remains longer the best cell on that frequency. Offsets can also be used in the case of neighboring cells with different Tx power (e.g., macrocells/femtocells), again to keep the UE longer on the femtocell that would benefit from a better UL due to a smaller cell size.

Frequency Specific Offsets

Propagation conditions between different frequencies vary. For this reason, when evaluating the quality of a neighboring cell on a certain frequency, a frequency specific Ofn is used in all applicable events. For example, A4 applies the Ofn to the neighboring cell measurement to verify if the quality of the cell is sufficient.

With regard to related art "solutions", and specifically with regard to measurements, RAN2 has attempted to limit the actions required to be taken with regard to measurements by the network at intra-frequency and inter-frequency handover as much as possible (see 3GPP TS 36.331, section 5.5.6.1).

If the neighboring cell list does not need to be adapted (which is typical in LTE), at intra-frequency handover no action is needed and at inter-frequency handover only the measurement gap pattern needs to be setup again. However, this is not completely true for a cell that requires the usage of a different cell specific offset.

As explained above, the cell specific offset is used to extend/decrease the effective cell coverage area. If it is assumed that a network is using measurement event A2 (e.g., as a trigger for starting inter-RAT measurements), then when the serving cell quality+hysteresis goes below a threshold, the network will be notified by the UE and the network will use this to trigger inter-RAT measurements.

If two neighboring cells would have significantly different Ocs, it will mean that at the intra-freq handover the threshold should be adapted for the new cell. This is because A2 does not use Ocs, but there is a desire to continue using the same coverage area. This is described below with reference to in FIG. 4.

Figure 4:
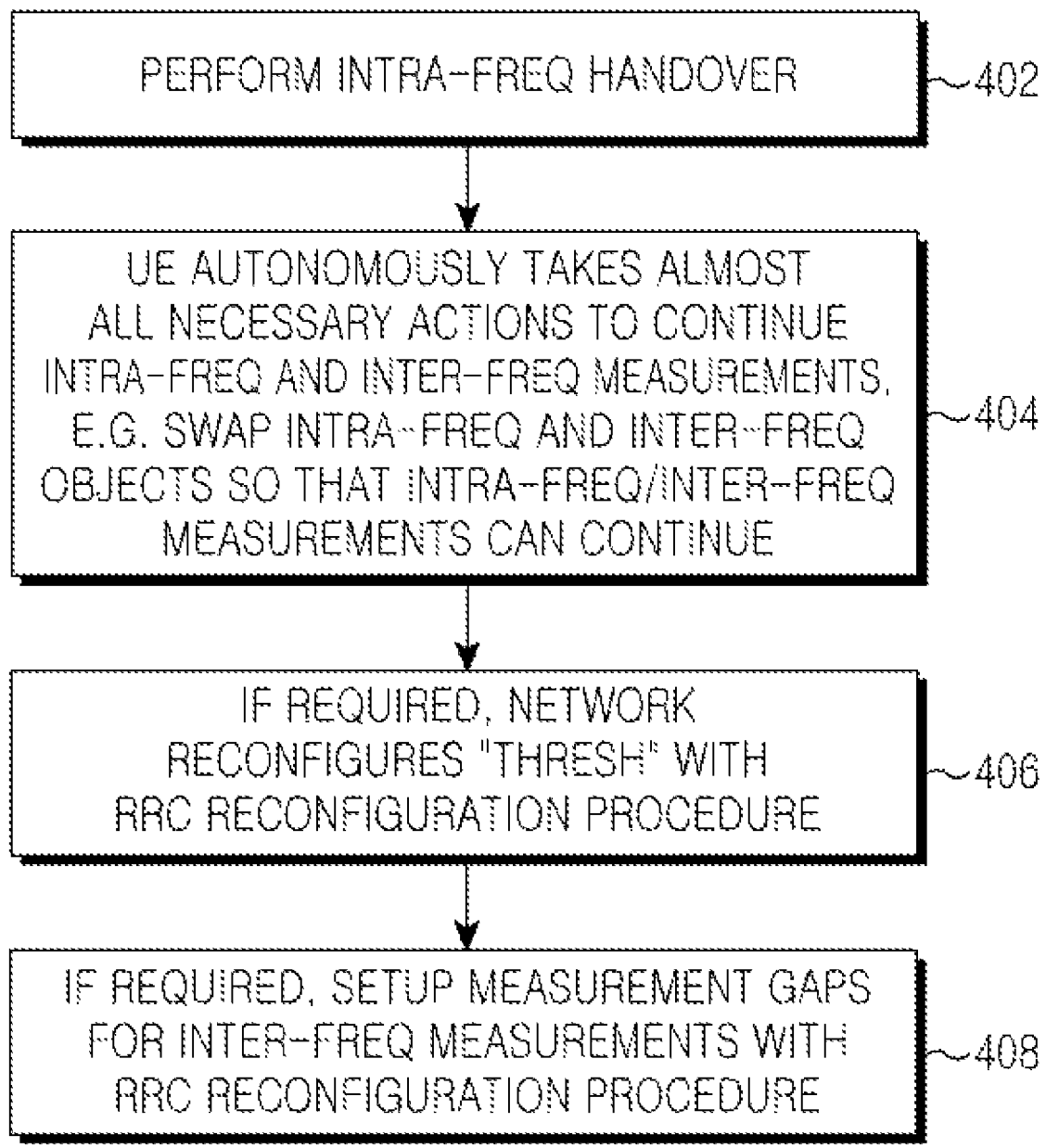
FIG. 4 is a flowchart illustrating a method according to the related art.

FIG. 4 is a flowchart illustrating a method according to the related art.

Referring to FIG. 4, intra-frequency handover is performed in step 402. In step 404, a UE autonomously takes almost all necessary actions to continue intra-frequency and inter-frequency measurements. For example, swap intra-frequency and inter-frequency objects so that intra-frequency/inter-frequency measurements can continue. In step 406, if required, the network reconfigures threshold with RRC reconfiguration procedure. In step 408, if required, measurement gaps are setup for inter-frequency measurements with RRC reconfiguration procedure.

Certain exemplary embodiments of the present invention provide a solution in which all evaluations of serving cell quality apply Ocs and Ofs, as shown in Table 2. Table 2 shows proposed entering/leaving conditions for event based measurement reporting.

TABLE 2

| | Entering condition | Leaving condition |
|---|---|---|
| Event A1 (Serving becomes better than threshold) | Ms + Ofs + Ocs − Hys > Thresh | Ms + Ofs + Ocs + Hys < Thresh |
| Event A2 (Serving becomes worse than threshold) | Ms + Ofs + Ocs + Hys < Thresh | Ms + Ofs + Ocs − Hys > Thresh |
| Event A3 (Neighbor becomes offset better than serving) | Mn + Ofn + Ocn − Hys > Ms + Ofs + | Mn + Ofn + Ocn + Hys < Ms + Ofs + |

TABLE 2-continued

| | Entering condition | Leaving condition |
|---|---|---|
| Event A4 (Neighbor becomes better than threshold) | Ocs + Off Mn + Ofn + Ocn − Hys > Thresh | Ocs + Off Mn + Ofn + Ocn + Hys < Thresh |
| Event A5 (Serving becomes worse than threshold1 and neighbor becomes better than threshold2) | Ms + Ofs + Ocs + Hys < Thresh1 AND Mn + Ofn + Ocn − Hys > Thresh2 | Ms + Ofs + Ocs − Hys > Thresh 1 OR Mn + Ofn + Ocn + Hys < Thresh 2 |
| Event B1 (Inter RAT neighbor becomes better than threshold) | Mn + Ofn − Hys > Thresh | Mn + Ofn + Hys < Thresh |
| Event B2 (Serving becomes worse than threshold1 and inter RAT neighbor becomes better than threshold2) | Ms + Ofs + Ocs + Hys < Thresh 1 AND Mn + Ofn − Hys > Thresh2 | Ms + Ofs + Ocs − Hys > Thresh 1 OR Mn + Ofn + Hys < Thresh 2 |

The entering/leaving conditions proposed in Table 2 provide advantages over the related art as described below.

By also applying Ocs in events, such as A2, this allows continuation of the event after an intra-freq handover without changing the threshold, thus limiting the required amount of signaling from the network at handover. A similar reasoning can be made for events A1, A5 and B2.

Propagation conditions between different frequencies vary. For this reason, when evaluating the quality of a neighboring cell on a certain frequency, the frequency offset Ofn is used in all applicable events. For example, A4 applies the Ofn to the neighboring cell measurement to verify if the quality of the cell is sufficient.

Again, to limit changes to threshold, one can also argue here that applying Ofs in events like A1, A2, A5 and B2 is advantageous. If two carriers have a different Ofx, then most likely, a different threshold would be applicable.

It is true that applying the Ofs in these events is less beneficial than applying the Ocs as proposed in 2.2, since the threshold would only need to be updated at inter-freq events, such as where measurement gaps might need to be activated anyway. Note however, that applying Ocn in the indicated events also makes the resulting entering/leaving conditions consistent. In all cases the applicable Ocx and Ofx are used on the measured Mx.

Figure 5:
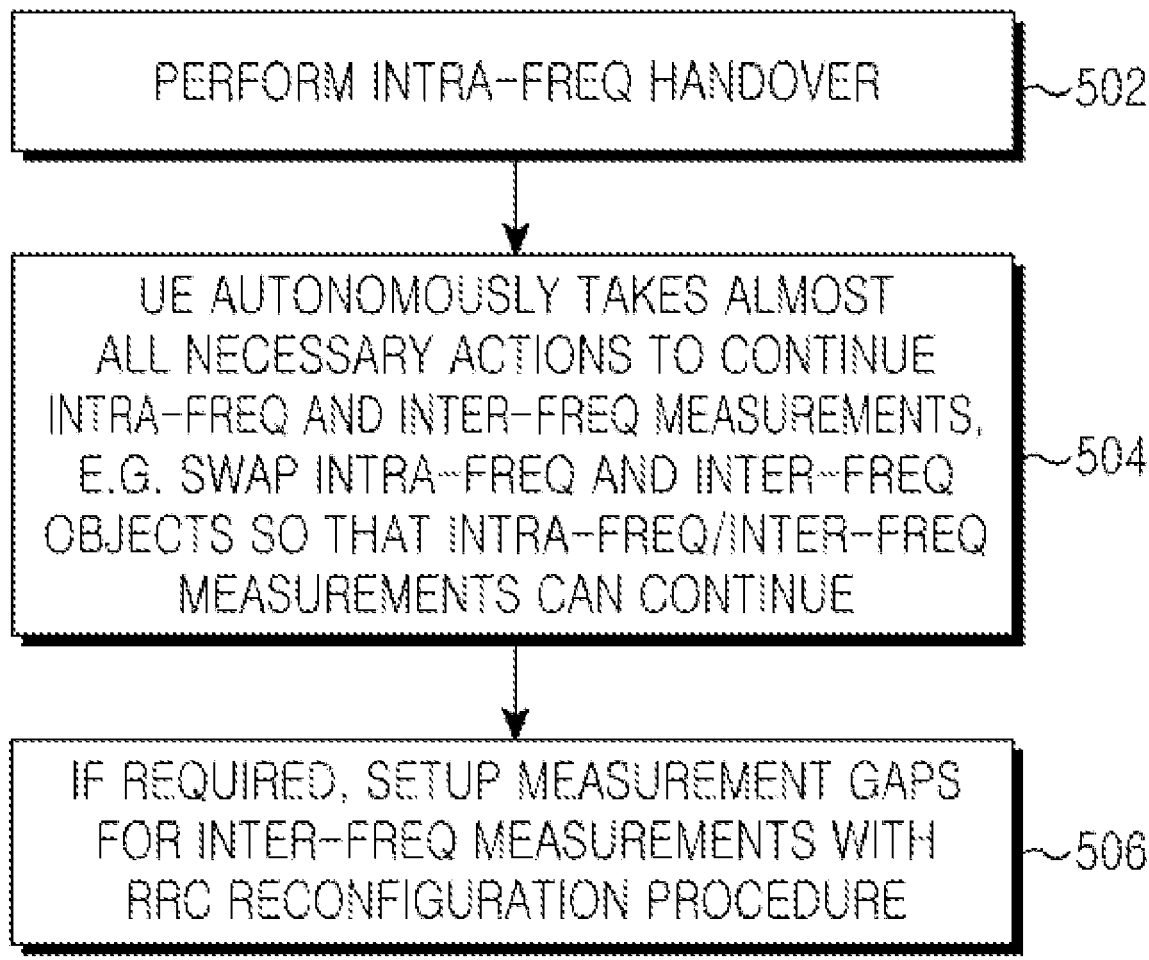
FIG. 5 is a flowchart illustrating a method according to an exemplary embodiment of the present invention.

The resulting Flow diagram is illustrated in FIG. 5.

FIG. 5 is a flowchart illustrating a method according to an exemplary embodiment of the present invention.

Referring to FIG. 5, intra-frequency handover is performed in step 502. In step 504, a UE autonomously takes almost all necessary actions to continue intra-frequency and inter-frequency measurements. For example, swap intra-frequency and inter-frequency objects so that intra-frequency/inter-frequency measurements can continue. In step 506, if required, measurement gaps are setup for inter-frequency measurements with RRC reconfiguration procedure.

Herein, this saves the action of the network having to reconfigure the threshold for the events A1, A2, A5 and B2, thereby reducing the signaling effort at handover. In addition, the event criteria have become more consistent.

It will be appreciated that exemplary embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing a system or method as claimed in any one of the claims of this specification and a machine-readable storage storing such a program. Still further, such programs may be conveyed electronically via any medium such as a communication signal carried over a wired or wireless connection and exemplary embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Features, integers, characteristics, compounds, chemical moieties or groups described in conjunction with a particular aspect, exemplary embodiment or example of the present invention are to be understood to be applicable to any other aspect, exemplary embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present invention is not restricted to the details of any foregoing exemplary embodiments. The present invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Throughout this specification a number of abbreviations are used. Those abbreviations are defined as follows:

1xRTT CDMA2000 1x Radio Transmission Technology
AM Acknowledged Mode
ASN.1 Abstract Syntax Notation.1
ARQ Automatic Repeat Request
AS Access Stratum
BCCH Broadcast Control Channel
BCH Broadcast Channel
CCCH Common Control Channel
CCO Cell Change Order
CP Control Plane
C-RNTI Cell RNTI
CSG Closed Subscriber Group
DCCH Dedicated Control Channel
DRB (user) Data Radio Bearer
DRX Discontinuous Reception
DTCH Dedicated Traffic Channel
DL Downlink
DL-SCH Downlink Shared Channel
ETWS Earthquake and Tsunami Warning System
E-UTRA Evolved Universal Terrestrial Radio Access
E-UTRAN Evolved Universal Terrestrial Radio Access Network
ENB Evolved Node B
EPC Enhanced Packet Core
EPS Enhanced Packet System
FLOOR Mathematical function used to 'round down', i.e., to the nearest integer having a lower value
FDD Frequency Division Duplex
FFS For Further Study
GERAN GSM/EDGE Radio Access Network
GSM Global System for Mobile Communications
HARQ Hybrid Automatic Repeat Request
HRPD CDMA2000 High Rate Packet Data
IE Information element
IMEI International Mobile Equipment Identity
IMSI International Mobile Subscriber Identity
kB Kilobyte (1000 bytes)
L1 Layer 1
L2 Layer 2
L3 Layer 3
MAC Medium Access Control
MBMS Multimedia Broadcast Multicast Service
MBSFN Multimedia Broadcast multicast service Single Frequency Network
MIB Master Information Block
N/A Not Applicable
NACC Network Assisted Cell Change
NAS Non Access Stratum
PCCH Paging Control Channel
PDU Protocol Data Unit
PDCP Packet Data Convergence Protocol
PLMN Public Land Mobile Network
QoS Quality of Service
RACH Random Access CHannel
RAT Radio Access Technology
RB Radio Bearer
RLC Radio Link Control
RNTI Radio Network Temporary Identifier
RRC Radio Resource Control
RSCP Received Signal Code Power
RSRP Reference Signal Received Power
RSSI Received Signal Strength Indicator
SAE System Architecture Evolution
SAP Service Access Point
SI Scheduling Information
SIB System Information Block
SI-RNTI System Information RNTI
SPS Semi-Persistent Scheduling
SRB Signaling Radio Bearer
S-TMSI SAE Temporary Mobile Station Identifier
TA Tracking Area
TDD Time Division Duplex
TM Transparent Mode
TPC-RNTI Transmit Power Control RNTI
UE User Equipment
UICC Universal Integrated Circuit Card
UL Uplink UM Unacknowledged Mode
UL-SCH Uplink Shared Channel
UP User Plane
UTRAN Universal Terrestrial Radio Access Network It will be appreciated from the preceding text that in exemplary embodiments of the present invention new criteria (comprising combinations of parameters/variables) are used to define entering conditions and leaving conditions associated with particular events, as compared with the criteria defining those conditions in 3GPP TS 36.331 v 8.4.0. For reference, below is an extract from 3GPP TS 36.331 v 8.4.0. It will be appreciated that this extract provides definitions of the various variables and parameters which apply to exemplary embodiments of the present invention defined above. However, the definitions of the entering and leaving conditions for the events in this extract correspond to the related art, and exemplary embodiments of the present invention use new, different criteria as explained above.

BEGINNING OF EXTRACT OF 3GPP TS 36.331 v 8.4.0

5.5.4.2 Event A1 (Serving Becomes Better than Threshold)
The UE shall:
1> apply inequality A1-1, as specified below, as the entry condition for this event;
1> apply inequality A1-2, as specified below, as the leaving condition for this event;

$Ms-Hys>Thresh$  Inequality A1-1 (Entering condition)

$Ms+Hys<Thresh$  Inequality A1-2 (Leaving condition)

The variables in the formula are defined as follows:
Ms is the measurement result of the serving cell, not taking into account any cell individual offset.
Hys is the hysteresis parameter for this event (i.e., hysteresis as defined within the VarMeasurementConfiguration for this event).
Thresh is the threshold parameter for this event (i.e., a1-Threshold as defined within the VarMeasurementConfiguration for this event).
Ms is expressed in dBm in case of RSRP, or in dB in case of RSRQ.
Hys is expressed in dB.
Thresh is expressed in dBm in case Ms is expressed in dBm; otherwise it is expressed in dB.

5.5.4.3 Event A2 (Serving Becomes Worse than Threshold)
The UE shall:
1> apply inequality A2-1, as specified below, as the entry condition for this event;
1> apply inequality A2-2, as specified below, as the leaving condition for this event;

$Ms+Hys<Thresh$  Inequality A2-1 (Entering condition)

$Ms-Hys>Thresh$  Inequality A2-2 (Leaving condition)

The variables in the formula are defined as follows:
Ms is the measurement result of the serving cell, not taking into account any cell individual offset.
Hys is the hysteresis parameter for this event (i.e., hysteresis as defined within the VarMeasurementConfiguration for this event).
Thresh is the threshold parameter for this event (i.e., a2-Threshold as defined within the VarMeasurementConfiguration for this event).
Ms is expressed in dBm in case of RSRP, or in dB in case of RSRQ.
Hys is expressed in dB.
Thresh is expressed in dBm in case Ms is expressed in dBm; otherwise it is expressed in dB.

5.5.4.4 Event A3 (Neighbor Becomes Offset Better than Serving)
The UE shall:
1> apply inequality A3-1, as specified below, as the entry condition for this event;
1> apply inequality A3-2, as specified below, as the leaving condition for this event;

$Mn+Ofn+Ocn-Hys>Ms+Ofs+Ocs+Off$  Inequality A3-1 (Entering condition)

$Mn+Ofn+Ocn+Hys<Ms+Ofs+Ocs+Off$  Inequality A3-2 (Leaving condition)

The variables in the formula are defined as follows:
Mn is the measurement result of the neighboring cell.
Ofn is the frequency specific offset of the frequency of the neighbor cell (equals Ofs for intra-frequency measurements and is included in MeasObjectEUTRA corresponding to the inter frequency as offsetFreq for inter-frequency measurements).
Ocn is the cell specific offset of the neighbor cell. If not configured zero offset shall be applied (included in MeasObjectEUTRA of the serving frequency as parameter cellIndividualOffset for intra-f measurements and included in MeasObjectEUTRA corresponding to the inter frequency as parameter cellIndividualOffset for inter-frequency measurements).
Ms is the measurement result of the serving cell, not taking into account any cell individual offset.
Ofs is the frequency specific offset of the serving frequency (i.e., offsetFreq within the MeasObjectEUTRA corresponding to the serving frequency).
Ocs is the cell specific offset of the serving cell (included in MeasObjectEUTRA of the serving frequency as parameter cellIndividualOffset).
Hys is the hysteresis parameter for this event (i.e., hysteresis as defined within the VarMeasurementConfiguration for this event).
Off is the offset parameter for this event (i.e., a3-Offset as defined within the VarMeasurementConfiguration for this event).
Mn, Ms are expressed in dBm in case of RSRP, or in dB in case of RSRQ.
Ofn, Ocn, Ofs, Ocs, Hys, Off are expressed in dB.

5.5.4.5 Event A4 (Neighbor Becomes Better than Threshold)
The UE shall:
1> apply inequality A4-1, as specified below, as the entry condition for this event;
1> apply inequality A4-2, as specified below, as the leaving condition for this event;

$Mn+Ofn+Ocn-Hys>Thresh$  Inequality A4-1 (Entering condition)

$Mn+Ofn+Ocn+Hys<Thresh$  Inequality A4-2 (Leaving condition)

The variables in the formula are defined as follows:
Mn is the measurement result of the neighboring cell.
Ofn is the frequency specific offset of the frequency of the neighbor cell.
Ocn is the cell specific offset of the neighbor cell.
Hys is the hysteresis parameter for this event (i.e., hysteresis as defined within the VarMeasurementConfiguration for this event).
Thresh is the threshold parameter for this event (i.e., a4-Threshold as defined within the VarMeasurementConfiguration for this event).
Mn is expressed in dBm in case of RSRP, or in dB in case of RSRQ.
Ofn, Ocn, Hys are expressed in dB.

Thresh is expressed in dBm in case Ms is expressed in dBm; otherwise it is expressed in dB.

5.5.4.6 Event A5 (Serving Becomes Worse than Threshold1 and Neighbor Becomes Better than Threshold2)

The UE shall:

1> apply inequality A5-1 and equation A5-2 i.e., both have to be fulfilled, as specified below, as the entry condition for this;

1> apply inequality A5-3 and equation A5-4 i.e., at least one of the two has to be fulfilled, as specified below, as the leaving condition for this event;

$Ms+Hys<Thresh1$    Inequality A5-1 (Entering condition 1)

$Mn+Ofn+Ocn-Hys>Thresh2$   Inequality A5-2 (Entering condition 2)

$Ms-Hys>Thresh1$    Inequality A5-3 (Leaving condition 1)

$Mn+Ofn+Ocn+Hys<Thresh2$   Inequality A5-4 (Leaving condition 2)

The variables in the formula are defined as follows:

Ms is the measurement result of the serving cell, not taking into account any cell individual offset.

Mn is the measurement result of the neighboring cell.

Ofn is the frequency specific offset of the frequency of the neighbor cell.

Ocn is the cell specific offset of the neighbor cell.

Hys is the hysteresis parameter for this event (i.e., hysteresis as defined within the VarMeasurementConfiguration for this event).

Thresh1 is the threshold parameter for this event (i.e., a5-Threshold1 as defined within the VarMeasurementConfiguration for this event).

Thresh2 is the threshold parameter for this event (i.e., a5-Threshold2 as defined within the VarMeasurementConfiguration for this event).

Mn, Ms are expressed in dBm in case of RSRP, or in dB in case of RSRQ.

Ofn, Ocn, Hys are expressed in dB.

Thresh1 is expressed in dBm in case Ms is expressed in dBm; otherwise it is expressed in dB.

Thresh2 is expressed in dBm in case Mn is expressed in dBm; otherwise it is expressed in dB.

5.5.4.7 Event B1 (Inter RAT Neighbor Becomes Better than Threshold)

The UE shall:

1> for UTRA and CDMA2000, only trigger the event for cells included in the corresponding measurement object;

1> apply inequality B1-1, as specified below, as the entry condition for this event;

1> apply inequality B1-2, as specified below, as the leaving condition for this event;

$Mn+Ofn-Hys>Thresh$    Inequality B1-1 (Entering condition)

$Mn+Ofn+Hys<Thresh$    Inequality B1-2 (Leaving condition)

The variables in the formula are defined as follows:

Mn is the measurement result of the neighboring inter RAT cell.

Ofn is the frequency specific offset of the frequency of the neighbor cell.

Hys is the hysteresis parameter for this event (i.e., hysteresis as defined within the VarMeasurementConfiguration for this event).

Thresh is the threshold parameter for this event (i.e., b1-Threshold as defined within the VarMeasurementConfiguration for this event).

Mn is expressed in dBm or in dB, depending on the measurement quantity of the neighboring inter RAT cell.

Ofn, Hys are expressed in dB.

Thresh is expressed in dBm in case Mn is expressed in dBm; otherwise it is expressed in dB.

5.5.4.8 Event B2 (Serving Becomes Worse than Threshold1 and Inter Rat Neighbor Becomes Better than Threshold2)

The UE shall:

1> for UTRA and CDMA2000, only trigger the event for cells included in the corresponding measurement object;

1> apply inequality B2-1 and inequality B2-2 i.e., both have to be fulfilled, as specified below, as the entry condition for this event;

1> apply inequality B3-3 and inequality B2-4 i.e., at least one of the two has to be fulfilled, as specified below, as the leaving condition for this event;

$Ms+Hys<Thresh1$    Inequality B2-1 (Entering condition 1)

$Mn+Ofn-Hys>Thresh2$    Inequality B2-2 (Entering condition 2)

$Ms-Hys>Thresh1$    Inequality B2-3 (Leaving condition 1)

$Mn+Ofn+Hys<Thresh2$    Inequality B2-4 (Leaving condition 2)

The variables in the formula are defined as follows:

Ms is the measurement result of the serving cell, not taking into account any cell individual offset.

Mn is the measurement result of the neighboring inter RAT cell.

Ofn is the frequency specific offset of the frequency of the neighbor cell.

Hys is the hysteresis parameter for this event (i.e., hysteresis as defined within the VarMeasurementConfiguration for this event).

Thresh1 is the threshold parameter for this event (i.e., b2-Threshold1 as defined within the VarMeasurementConfiguration for this event).

Thresh2 is the threshold parameter for this event (i.e., b2-Threshold2 as defined within the VarMeasurementConfiguration for this event).

Ms is expressed in dBm in case of RSRP, or in dB in case of RSRQ.

Mn is expressed in dBm or dB, depending on the measurement quantity of the neighboring inter RAT cell.

Ofn, Hys are expressed in dB.

Thresh1 is expressed in dBm in case Ms is expressed in dBm; otherwise it is expressed in dB.

Thresh2 is expressed in dBm in case Mn is expressed in dBm; otherwise it is expressed in dB.

END OF EXTRACT OF 3GPP TS 36.331 v 8.4.0

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A User Equipment (UE) for use in a cellular wireless communications network, the UE comprising:

a measuring unit for measuring signals received from at least one of a serving cell of a network and neighboring cells;

a memory for storing information defining a plurality of conditions for triggering the UE to send a measurement report to the network, the measurement report comprising a result of at least one measurement performed by the UE;

a determining unit for determining when one of the plurality of conditions is met; and a sending unit for sending, in response to one of the plurality of conditions being met, the measurement report,
wherein each of the plurality of conditions is defined by at least:
- a result of a measurement of a signal received from the serving cell;
- a threshold parameter;
- at least one offset value associated with the serving cell; and
- at least one offset value associated with a serving frequency.

2. The UE of claim 1, further comprising:
a receiving unit for receiving the information from the network.

3. The UE of claim 1, wherein the plurality of conditions comprises a condition defined by at least one of:

$Ms+Ofs+Ocs-Hys>Thresh;$ $Ms+Ofs+Ocs+Hys<Thresh;$ $Ms+Ofs+Ocs+Hys<Thresh;$ $Ms+Ofs+Ocs-Hys>Thresh;$ $(Ms+Ofs+Ocs+Hys<Thresh1)$ AND $(Mn+Ofn+Ocn-Hys>Thresh2);$ $(Ms+Ofs+Ocs-Hys>Thresh1)$ OR $(Mn+Ofn+Ocn+Hys<Thresh2);$ $(Ms+Ofs+Ocs+Hys<Thresh1)$ AND $(Mn+Ofn-Hys>Thresh2);$ and $(Ms+Ofs+Ocs-Hys>Thresh1)$ OR $(Mn+Ofn+Hys<Thresh2),$ and wherein,
Ms denotes a measurement result of the serving cell,
Mn denotes a measurement result of a neighboring cell,
Ofn denotes a frequency specific offset of a frequency of the neighboring cell,
Ocn denotes a cell specific offset of the neighboring cell,
Ofs denotes a frequency specific offset of the serving frequency,
Ocs denotes a cell specific offset of the serving cell,
Hys denotes a hysteresis parameter for a respective event,
Off denotes an offset parameter for the respective event,
Thresh denotes a threshold parameter for the respective event,
Thresh1 denotes a threshold parameter for the respective event, and
Thresh2 denotes a threshold parameter for the respective event.

4. A method of operating User Equipment (UE) adapted for use in a cellular wireless telecommunications network, the method comprising:
measuring signals received from at least one of a serving cell of a network and neighboring cells;
storing information that defines a plurality of conditions for triggering the UE to send a measurement report to the network, the measurement report comprising a result of at least one measurement performed by the UE;
determining when one of the plurality of conditions is met; and
in response to one of the plurality of conditions being met, sending the measurement report,
wherein each of the plurality of conditions is defined by at least:
- a result of a measurement of a signal received from the serving cell;
- a threshold parameter;
- at least one offset value associated with the serving cell; and
- at least one offset value associated with a serving frequency.

5. The method of claim 4, further comprising:
receiving the information from the network.

6. The method of claim 4, wherein the plurality of conditions comprises a condition defined by at least one of:

$Ms+Ofs+Ocs-Hys>Thresh;$ $Ms+Ofs+Ocs+Hys<Thresh;$ $Ms+Ofs+Ocs+Hys<Thresh;$ $Ms+Ofs+Ocs-Hys>Thresh;$ $(Ms+Ofs+Ocs+Hys<Thresh1)$ AND $(Mn+Ofn+Ocn-Hys>Thresh2);$ $(Ms+Ofs+Ocs-Hys>Thresh1)$ OR $(Mn+Ofn+Ocn+Hys<Thresh2);$ $(Ms+Ofs+Ocs+Hys<Thresh1)$ AND $(Mn+Ofn-Hys>Thresh2);$ and $(Ms+Ofs+Ocs-Hys>Thresh1)$ OR $(Mn+Ofn+Hys<Thresh2),$ wherein,
Ms denotes a measurement result of the serving cell,
Mn denotes a measurement result of a neighboring cell,
Ofn denotes a frequency specific offset of a frequency of the neighboring cell,
Ocn denotes a cell specific offset of the neighboring cell,
Ofs denotes a frequency specific offset of the serving frequency,
Ocs denotes a cell specific offset of the serving cell,
Hys denotes a hysteresis parameter for a respective event,
Off denotes an offset parameter for the respective event,
Thresh denotes a threshold parameter for the respective event,
Thresh1 denotes a threshold parameter for the respective event, and
Thresh2 denotes a threshold parameter for the respective event.

7. A method of operating User Equipment (UE) adapted for use in a cellular wireless telecommunications network, the method comprising:
measuring signals received from at least one of a serving cell of a network and neighboring cells;
storing information that defines a plurality of conditions for triggering the UE to send a measurement report to the network, each condition being associated with a respective event, and the measurement report comprising a result of at least one measurement performed by the UE;
determining when one of the plurality of conditions is met; and
in response to one of the plurality of conditions being met, sending the measurement report,
wherein, the plurality of conditions include at least one of:

$Ms+Ofs+Ocs-Hys>Thresh;$ $Ms+Ofs+Ocs+Hys<Thresh;$ $Ms+Ofs+Ocs+Hys<Thresh;$ $Ms+Ofs+Ocs-Hys>Thresh;$ $(Ms+Ofs+Ocs+Hys<Thresh1)$ AND $(Mn+Ofn+Ocn-Hys>Thresh2);$ $(Ms+Ofs+Ocs-Hys>Thresh1)$ OR $(Mn+Ofn+Ocn+Hys<Thresh2);$ $(Ms+Ofs+Ocs+Hys<Thresh1)$ AND $(Mn+Ofn-Hys>Thresh2);$ and $(Ms+Ofs+Ocs-Hys>Thresh1)$ OR $(Mn+Ofn+Hys<Thresh2),$ and wherein,
Ms denotes a measurement result of the serving cell,
Mn denotes a measurement result of a neighboring cell,
Ofn denotes a frequency specific offset of a frequency of the neighboring cell,
Ocn denotes a cell specific offset of the neighboring cell,
Ofs denotes a frequency specific offset of the serving frequency,
Ocs denotes a cell specific offset of the serving cell,
Hys denotes a hysteresis parameter for a respective event,
Off denotes an offset parameter for the respective event,
Thresh denotes a threshold parameter for the respective event,
Thresh1 denotes a threshold parameter for the respective event, and
Thresh2 denotes a threshold parameter for the respective event.

* * * * *